United States Patent
Kawaguchi et al.

(10) Patent No.: US 8,217,114 B2
(45) Date of Patent: Jul. 10, 2012

(54) AQUEOUS COATING RESIN COMPOSITION AND AQUEOUS COATING COMPOSITION

(75) Inventors: Yohichi Kawaguchi, Hiratsuka (JP); Teppei Oohori, Hiratsuka (JP); Terutaka Takahashi, Hiratsuka (JP)

(73) Assignee: Kansai Paint Co., Ltd., Amagasaki-shi (JP)

( * ) Notice: Subject to any disclaimer, the term of this patent is extended or adjusted under 35 U.S.C. 154(b) by 472 days.

(21) Appl. No.: 12/439,308

(22) PCT Filed: Aug. 29, 2007

(86) PCT No.: PCT/JP2007/067248
§ 371 (c)(1),
(2), (4) Date: Feb. 27, 2009

(87) PCT Pub. No.: WO2008/026767
PCT Pub. Date: Mar. 6, 2008

(65) Prior Publication Data
US 2009/0306247 A1 Dec. 10, 2009

(30) Foreign Application Priority Data

Aug. 31, 2006 (JP) .................... 2006-236315

(51) Int. Cl.
*C09D 151/00* (2006.01)
*C09D 175/04* (2006.01)
*C09D 201/02* (2006.01)
*C09D 5/02* (2006.01)

(52) U.S. Cl. ............... 525/66; 525/69; 525/71; 525/74

(58) Field of Classification Search .............. 523/201; 525/69, 71, 66, 74
See application file for complete search history.

(56) References Cited

U.S. PATENT DOCUMENTS

| | | | |
|---|---|---|---|
| 4,079,028 A | | 3/1978 | Emmons et al. |
| 4,916,171 A | * | 4/1990 | Brown et al. ............ 523/161 |
| 5,185,387 A | * | 2/1993 | Klesse et al. ............ 523/201 |
| 6,632,915 B1 | * | 10/2003 | Schwarte et al. ........... 528/75 |
| 2005/0017397 A1 | * | 1/2005 | Silagy et al. ........... 264/173.11 |
| 2009/0270543 A1 | * | 10/2009 | Mongoin et al. ........... 524/426 |

FOREIGN PATENT DOCUMENTS

| | | |
|---|---|---|
| JP | 60-130640 A | 7/1985 |
| JP | 04-103680 A | 4/1992 |
| JP | 07-076614 A | 3/1995 |
| JP | 07-207220 A | 8/1995 |
| JP | 09-255728 A | 9/1997 |
| JP | 09-267034 A | 10/1997 |
| JP | 11-092708 A | 4/1999 |
| JP | 2002-047450 A | 2/2002 |
| JP | 2003-003037 A | 1/2003 |
| JP | 06-179826 A | 6/2004 |
| JP | 2005-239844 A | 9/2005 |
| JP | 2006-070095 A | 3/2006 |
| WO | WO 2007052122 * | 5/2007 |

OTHER PUBLICATIONS

Kurihashi et al., STN AN 1997:650768, Sep. 1997.*
International Search Report, PCT/JP2007/067248, completion of Search Report Oct. 23, 2007, mailing date Oct. 30, 2007, 3 pages, Japanese Patent Office.

* cited by examiner

*Primary Examiner* — Jeffrey Mullis
(74) *Attorney, Agent, or Firm* — Millen, White, Zelano, Branigen, P.C.

(57) ABSTRACT

An aqueous coating resin composition comprising a water-dispersible nonionic resin (A) and a water-dispersible anionic core-shell resin (B), characterized in that the water-dispersible nonionic resin (A) contains a polyoxyalkylene group-containing polymerizable unsaturated monomer (a1) at 5-50 mass % of the total polymerizable unsaturated monomer used for production of the resin (A), and the water-dispersible anionic core-shell resin (B) contains an anionic group in the resin. It is possible to provide aqueous coating compositions exhibiting both satisfactory coating manageability and finished appearance.

11 Claims, No Drawings

AQUEOUS COATING RESIN COMPOSITION AND AQUEOUS COATING COMPOSITION

TECHNICAL FIELD

The present invention relates to an aqueous coating resin composition capable of exhibiting pseudoplastic viscosity, and to an aqueous coating composition containing the aqueous coating resin composition.

BACKGROUND ART

Recent years have seen intensified interest in the use of aqueous coating materials from the viewpoint of environmental conservation, reduced usage of resources and energy savings, and aqueous coating materials are also being developed for "metallic paints" that are applied as finish coatings on automobile bodies and the like.

A problem commonly associated with aqueous coating materials is the difficulty of achieving both low viscosity through atomization by spraying or the like, which is preferable for producing coated surfaces with an excellent finished appearance, and high viscosity which is preferred for avoiding post-coating sagging or preventing sedimentation of pigments during storage.

It has been attempted to circumvent this problem with coating material designs that impart pseudoplastic viscosity to aqueous-based coating compositions.

Pseudoplastic viscosity is a phenomenon whereby viscosity is reduced with increasing shear rate, and it is well known in the field of coating materials that a coating composition exhibiting pseudoplastic viscosity is able to exhibit a sufficiently low viscosity for atomization under high shear rates such as during spraying and a sufficiently high viscosity so as not to sagging under low shear rates such as during coating, so that both coated surface smoothness and sagging resistance can be achieved.

Compositions containing polymer fine particles and acrylic copolymer aqueous solutions are well known as means of imparting pseudoplastic viscosity to aqueous coating compositions (for example, Japanese Examined Patent Publication HEI No. 2-32947: Patent document 1).

As another example of a composition containing polymer fine particles and an acrylic copolymer aqueous solution, Japanese Unexamined Patent Publication HEI No. 7-53913 (Patent document 2) describes an aqueous coating composition containing an aqueous dispersion of carboxyl group-containing acrylic resin particles and a film-forming polymer obtained by neutralizing at least some of the acidic groups in a copolymer of an amide group-containing ethylenic unsaturated monomer, an acidic group-containing ethylenic unsaturated monomer and a hydroxyl-containing ethylenic unsaturated monomer, as a metallic based coating material with low sagging and excellent coating manageability which is also able to form coated films with improved outer appearance.

Also, as a base coat coating material capable of forming coated films with excellent water resistance and adhesion, Japanese Unexamined Patent Publication HEI No. 10-306236 (Patent document 3) describes an aqueous coating composition comprising an acrylic resin emulsion and/or urethane resin emulsion, and a water-soluble acrylic resin obtained by using a neutralizer to neutralize an acrylic copolymer that is produced by copolymerization of an alkylene oxide group-containing (meth)acrylate, a cyclic saturated hydrocarbon group-containing (meth)acrylate, and another unsaturated monomer.

The compositions described in Patent documents 1-3 employ water-soluble resins, obtained using neutralizers for neutralization of the acidic groups of acidic group-containing resins, as coated film-forming components for combination with polymer fine particles, from the standpoint of ensuring solubility in aqueous media, achieving satisfactory storage stability as coating materials and exhibiting sufficient affinity for pigments, and such water-soluble resins are now commonly employed in the field.

DISCLOSURE OF THE INVENTION

Problems to be Solved by the Invention

It is an object of the invention to provide a novel aqueous coating resin composition exhibiting pseudoplastic viscosity that is particularly suitable for an aqueous base coat coating material.

Means for Solving the Problems

The invention has been completed upon the knowledge that powerful pseudoplastic viscosity is exhibited by a resin composition for an aqueous based coating composition that employs a specific water-dispersible nonionic resin instead of a conventional water-soluble acid group-containing resin, when it is combined with a specific water-dispersible anionic core-shell resin.

The invention therefore provides the following 1-11.

1. An aqueous coating resin composition comprising a water-dispersible nonionic resin (A) and a water-dispersible anionic core-shell resin (B), characterized in that the water-dispersible nonionic resin (A) contains a polyoxyalkylene group-containing polymerizable unsaturated monomer (a1) at 5-50 mass % of the total polymerizable unsaturated monomer used for production of the resin (A), and the water-dispersible anionic core-shell resin (B) contains an anionic group in the resin.

2. An aqueous coating resin composition according to 1. above, wherein the water-dispersible nonionic resin (A) is obtained by copolymerizing a polymerizable unsaturated monomer mixture containing the polyoxyalkylene group-containing polymerizable unsaturated monomer (a1) at 5-50 mass %, in the presence of a hydrophilic organic solvent.

3. An aqueous coating resin composition according to 1. or 2. above, wherein the mean particle size of the nonionic resin particles in a dispersion obtained by dispersing the water-dispersible nonionic resin (A) in an aqueous medium is in the range of 10-200 nm.

4. An aqueous coating resin composition according to any one of 1. to 3. above, wherein the water-dispersible anionic core-shell resin (B) is produced by emulsion polymerization of a polymerizable unsaturated monomer in two stages, in the presence of water and an emulsifier.

5. An aqueous coating resin composition according to any one of 1. to 4. above, wherein the copolymerization ratio of C1 or C2 alkyl esters of (meth)acrylic acid in the water-dispersible anionic core-shell resin (B) is in the range of 40-90 mass % of the total polymerizable unsaturated monomer used for production of the resin (B).

6. An aqueous coating resin composition according to any one of 1. to 5. above, wherein the mean particle size of the anionic resin particles in a dispersion obtained by dispersing the water-dispersible anionic core-shell resin (B) in an aqueous medium is in the range of 10-500 nm.

7. An aqueous coating resin composition according to any one of 1. to 6. above, wherein the proportion of the water-dispersible nonionic resin (A) and water-dispersible anionic core-shell resin (B) used is in the range of 10/90-90/10, as the nonvolatile component weight ratio of (A)/(B).

8. An aqueous coating resin composition according to any one of 1. to 7. above, which further contains a associative thickener based on polyurethane.

9. An aqueous coating composition comprising an aqueous coating resin composition according to any one of 1. to 8. above.

10. A coating method whereby an aqueous coating composition according to 9. above is applied onto an article to be coated.

11. A coated article having a coated film formed from an aqueous coating composition according to 9. above.

Effect of the Invention

While the exact reason for the powerful pseudoplastic viscosity exhibited by the resin composition of the invention is not fully understood, it is attributed to the fact that the nonionic resin particles having polyoxyalkylene groups on the side chains exhibit moderate affinity for the surfaces of the core-shell resin particles with anionic groups, so that all of the resin particles in the composition participate in a suitable degree of interaction.

The aqueous coating composition containing such a resin composition exhibits low viscosity under high shear rate such as during spray coating, while also exhibiting sufficient viscosity to avoid sagging under low shear rate such as during coating, and therefore its flow properties are satisfactory and its coating manageability and finished appearance are both acceptable.

BEST MODE FOR CARRYING OUT THE INVENTION

Preferred embodiments of the invention will now be explained in detail with the understanding that the invention is not limited only to these embodiments, and various modifications may be implemented that are within the spirit and scope of the invention.

The resin composition of the invention comprises a water-dispersible nonionic resin (A) and a water-dispersible anionic core-shell resin (B). The components used in the resin composition of the invention will now be explained in order.

Water-Dispersible Nonionic Resin (A)

According to the invention, the water-dispersible nonionic resin (A) is characterized by being a resin containing a polyoxyalkylene group-containing polymerizable unsaturated monomer (a1) at 5-50 mass % and preferably 8-35 mass % of the total polymerizable unsaturated monomer used for production of the resin (A), and in that the resin is a water dispersible resin.

Throughout the present specification, the term "water dispersible" is used to signify that the mean particle size of the dispersed resin obtained by dispersing the resin in water is at least 10 nm.

Also, throughout the present specification, the mean particle size is the value measured by light scattering using a submicron particle analyzer by Beckman Coulter, Inc.

If the copolymerization of monomer (a1) is less than 5 mass % it will be difficult to stably maintain dispersion in the aqueous medium and anomalies such as lumps may be produced on the coated surface due to deposition, while if it is greater than 50 mass % it will not be possible to achieve sufficient interaction between the particles of the anionic core-shell resin described hereunder, thus preventing the desired viscosity from being obtained.

The polyoxyalkylene group-containing polymerizable unsaturated monomer (a1) may be a compound with a polyoxyalkylene group and a polymerizable unsaturated group in the molecule.

As polyoxyalkylene groups there may be mentioned polyoxyethylene, polyoxypropylene and polyoxybutylene groups, and they may be blocks of polyoxyethylene groups and polyoxypropylene groups, or blocks consisting of combinations of two or more of these groups.

As polymerizable unsaturated groups there may be mentioned (meth)acryloyl, allyl, vinyl and the like.

As examples for the polyoxyalkylene group-containing polymerizable unsaturated monomer (a1) there may be mentioned compounds represented by the following formula.

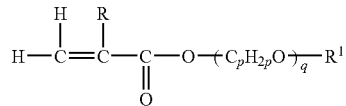

(In this formula, R represents hydrogen or methyl, $R^1$ represents hydrogen or C1-4 alkyl, p is an integer of 2 or 3 and preferably 2, q is an integer of 4-60 and preferably 6-50, and the q oxyalkylene units $(C_pH_{2p}O)$ may be the same or different.)

As specific examples for the polyoxyalkylene group-containing polymerizable unsaturated monomer (a1) there may be mentioned tetraethyleneglycol (meth)acrylate, methoxytetraethyleneglycol (meth)acrylate, ethoxytetraethyleneglycol (meth)acrylate, n-butoxytetraethyleneglycol (meth)acrylate, tetrapropyleneglycol (meth)acrylate, methoxytetrapropyleneglycol (meth)acrylate, ethoxytetrapropyleneglycol (meth)acrylate, n-butoxytetrapropyleneglycol (meth)acrylate, polyethyleneglycol (meth)acrylate, methoxypolyethyleneglycol (meth)acrylate, ethoxypolyethyleneglycol (meth)acrylate, polypropyleneglycol (meth)acrylate, methoxypolypropyleneglycol (meth)acrylate and ethoxypolypropyleneglycol (meth)acrylate, any of which may be used alone or in combinations of two or more.

The other polymerizable unsaturated monomer that is copolymerizable with the polyoxyalkylene group-containing polymerizable unsaturated monomer (a1) in the nonionic resin (A) is preferably a polymerizable unsaturated monomer that is copolymerizable with the monomer (a1), and it is preferably a compound with a polymerizable unsaturated group in the molecule and containing essentially no ionic functional groups.

Throughout the present specification, the term "ionic functional group" refers to a functional group that is positively or negatively chargeable, and as examples there may be mentioned anionic groups such as carboxyl, sulfonic acid and phosphate groups, and cationic groups such as amino groups.

As specific examples for the polymerizable unsaturated monomer there may be mentioned straight-chain or branched alkyl-containing (meth)acrylates such as methyl (meth)acrylate, ethyl (meth)acrylate, n-propyl (meth)acrylate, n-butyl (meth)acrylate, i-butyl (meth)acrylate, t-butyl (meth)acrylate, n-pentyl (meth)acrylate, n-hexyl (meth)acrylate, 2-ethylhexyl (meth)acrylate, lauryl (meth)acrylate and stearyl (meth)acrylate; vinyl aromatic compounds such as styrene and α-methylstyrene; alicyclic (meth)acrylates such as cyclohexyl (meth)acrylate and isobornyl (meth)acrylate; hydroxyalkyl (meth)acrylates such as 2-hydroxyethyl (meth)acrylate, 2-hydroxypropyl (meth)acrylate, 3-hydroxypropyl (meth) acrylate and hydroxybutyl (meth)acrylate; hydroxyl-containing polymerizable unsaturated monomers such as allyl alcohol and ε-caprolactone-modified forms of the foregoing hydroxyalkyl (meth)acrylates; alkoxyalkyl (meth)acrylates such as 2-methoxyethyl (meth)acrylate and 2-ethoxyethyl (meth)acrylate; perfluoroalkyl (meth)acrylates; N,N-diethylaminoethyl (meth)acrylate; (meth)acrylamides; (meth)acrylonitriles; vinyl ester compounds such as vinyl acetate and vinyl propionate; aralkyl (meth)acrylates such as benzyl (meth)acrylate; carbonyl group-containing polymerizable unsaturated monomers such as (meth)acrolein, formyl styrol, C4-7 vinylalkylketone (for example, vinylmethylketone, vinylethylketone, vinylbutylketone and the like), acetoacetoxyethyl (meth)acrylate, acetoacetoxyallyl ester and diacetone (meth)acrylamide; epoxy group-containing polymerizable unsaturated monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate and allylglycidyl ether; isocyanato group-containing polymerizable unsaturated monomers such as isocyanatoethyl (meth)acrylate and m-isopropenyl-α,α-dimethylbenzyl isocyanate; alkoxysilyl group-containing polymerizable unsaturated monomers such as vinyltrimethoxysilane, vinyltriethoxysilane, γ-methacryloyloxypropyltrimethoxysilane and γ-methacryloyloxypropyltriethoxysilane; and oxidation curable group-containing polymerizable unsaturated monomers such as dicyclopentenyloxyethyl (meth)acrylate, dicyclopentenyloxypropyl (meth)acrylate and dicyclopentenyl (meth)acrylate, any of which may be used alone or in combinations of two or more.

For the nonionic resin (A) according to the invention to be water-dispersible, the molecules composing the nonionic resin should have a suitable hydrophilic-hydrophobic structure, and preferably the other polymerizable unsaturated monomer which is copolymerized with the polyoxyalkylene group-containing polymerizable unsaturated monomer (a1) includes both a hydrophobic group-containing polymerizable unsaturated monomer and a hydroxyl-containing polymerizable unsaturated monomer as part of its components.

As examples of hydrophobic group-containing polymerizable unsaturated monomers there may be mentioned polymerizable unsaturated monomers with C4 and greater hydrocarbon groups, specific examples of which include straight-chain or branched alkyl group-containing (meth)acrylates such as n-butyl (meth)acrylate, i-butyl (meth)acrylate, t-butyl (meth)acrylate, n-pentyl (meth)acrylate, n-hexyl (meth)acrylate, 2-ethylhexyl (meth)acrylate, lauryl (meth)acrylate and stearyl (meth)acrylate; vinyl aromatic compounds such as styrene and α-methylstyrene; and alicyclic hydrocarbon group-containing (meth)acrylates such as cyclohexyl (meth) acrylate and isobornyl (meth)acrylate, any of which may be used alone or in combinations of two or more. (Meth)acrylates with alicyclic alkyl groups are especially preferred.

As the aforementioned hydroxyl-containing polymerizable unsaturated monomers there may be mentioned hydroxyalkyl (meth)acrylates such as 2-hydroxyethyl (meth) acrylate, 2-hydroxypropyl (meth)acrylate, 3-hydroxypropyl (meth)acrylate and hydroxybutyl (meth)acrylate, allyl alcohol, and ε-caprolactone-modified forms of hydroxyalkyl (meth)acrylates, any of which may be used alone or in combinations of two or more.

The water-dispersible nonionic resin (A) according to the invention can be produced by copolymerizing a polymerizable unsaturated monomer mixture containing the polyoxyalkylene group-containing polymerizable unsaturated monomer (a1) at 5-50 mass %, in the presence of a hydrophilic organic solvent, and it may be provided as a yellow transparent resin solution, for example.

As examples of hydrophilic organic solvents to be used for the copolymerization there may be mentioned alcohol-based organic solvents such as methanol, ethanol, isopropanol, n-butanol and isobutanol; ether-based organic solvents such as dioxane and tetrahydrofuran; ethyleneglycol ether-based organic solvents such as ethyleneglycol monomethyl ether, ethyleneglycol monoethyl ether, ethyleneglycol mono-n-propyl ether, ethyleneglycol monoisopropyl ether, ethyleneglycol mono-n-butyl ether, ethyleneglycol monoisobutyl ether and ethyleneglycol mono-tert-butyl ether; diethyleneglycol ether-based organic solvents such as diethyleneglycol monomethyl ether, diethyleneglycol monoethyl ether, diethyleneglycol mono-n-propyl ether, diethyleneglycol monoisopropyl ether, diethyleneglycol mono-n-butyl ether, diethyleneglycol monoisobutyl ether and diethyleneglycol mono-tert-butyl ether; propyleneglycol ether-based organic solvents such as propyleneglycol monomethyl ether, propyleneglycol monoethyl ether, propyleneglycol mono-n-propyl ether and propyleneglycol monoisopropyl ether; dipropyleneglycol ether-based organic solvents such as dipropyleneglycol monomethyl ether, dipropyleneglycol monoethyl ether, dipropyleneglycol mono-n-propyl ether and dipropyleneglycol monoisopropyl ether; and esteric organic solvents such as ethyl acetate, butyl acetate, isobutyl acetate and 3-methoxybutyl acetate; any of which may be used alone or in combinations of two or more. A hydrophobic organic solvent may also be used therewith so long as it does not interfere with the water dispersibility of the nonionic resin (A).

There are no particular restrictions on the polymerization initiator used for the polymerization, and as examples there may be mentioned organic peroxides such as tert-butylperoxy-2-ethyl hexanoate, benzoyl peroxide, octanoyl peroxide, lauroyl peroxide, stearoyl peroxide, cumene hydroperoxide, tert-butylhydroperoxide, tert-butylperoxy laurate, tert-butylperoxyisopropyl carbonate, tert-butylperoxy acetate and diisopropylbenzene hydroperoxide; azo compounds such as azobisisobutyronitrile, azobis(2,4-dimethylvaleronitrile), azobis(2-methylproprionitrile), azobis(2-methylbutyronitrile), 4,4'-azobis(4-cyanobutanoic acid), dimethylazobis(2-methyl propionate), azobis[2-methyl-N-(2-hydroxyethyl)-propionamide] and azobis{2-methyl-N-[2-(1-hydroxybutyl)]-propionamide}; and persulfuric acid salts such as potassium persulfate, ammonium persulfate and sodium persulfate.

According to the invention, the nonionic resin (A) preferably has a weight-average molecular weight in the range of 10,000-200,000 and especially 30,000-100,000 from the viewpoint of the finished appearance of the coated film formed using the aqueous coating resin composition of the invention, and a weight-average molecular weight in this range can be obtained by appropriately selecting the polymerization initiator and polymerization conditions.

The weight-average molecular weight referred to throughout the present specification is the value of the weight-average molecular weight measured by gel permeation chromatography (using an HLC8120GPC by Tosoh Corp.), with the weight-average molecular weight of polystyrene as reference. Four columns were used, namely "TSKgel G-4000H× L", "TSKgel G-3000H×L", "TSKgel G-2500H×L" and "TSKgel G-2000H×L" (all trade names of Tosoh Corp.), with the following conditions: mobile phase: tetrahydrofuran, measuring temperature: 40° C., flow rate: 1 mL/min, detector: RI.

The nonionic resin (A) may have a structure with polyoxyalkylene chains on the side chains of a hydrophobic main chain, and it can be prepared as an aqueous dispersion by mixing and stirring with an aqueous medium. It is believed that the nonionic resin particles dispersed in the aqueous medium interact with the anionic core-shell resin particles described hereunder, contributing to the pseudoplasticity of the aqueous coating resin composition of the invention.

An "aqueous medium", in this case, is water or a water-organic solvent mixture obtained by mixing water as the major component with an organic solvent such as a hydrophilic organic solvent.

The mean particle size of the nonionic resin particles in the dispersion obtained by dispersing the nonionic resin (A) in the aqueous medium is preferably 10-200 nm, more preferably 20-100 nm and even more preferably 30-70 nm, and from the standpoint of the pseudoplasticity of the aqueous coating resin composition of the invention and the smoothness of the coated surface formed therefrom, it is most suitably smaller than the mean particle size of the resin particles of the dispersion obtained by dispersing the anionic core-shell resin (B) in the aqueous medium.

Water-Dispersible Anionic Core-Shell Resin (B)

According to the invention, the water-dispersible anionic core-shell resin (B) is characterized by having anionic groups in the resin.

The water-dispersible anionic core-shell resin (B) is produced by emulsion polymerization of a polymerizable unsaturated monomer in two stages, in the presence of water and an emulsifier, and the resin is provided as a dispersion (or emulsion) obtained by its dispersion in an aqueous medium.

The resin aqueous dispersion composing the core in the anionic core-shell resin (B) is obtained by emulsion polymerization of a polymerizable unsaturated monomer mixture in the presence of an emulsifier.

There are no particular restrictions on the polymerizable unsaturated monomers, which may be any compounds with polymerizable unsaturated groups, and specific examples thereof include straight-chain or branched alkyl group-containing (meth)acrylates such as methyl (meth)acrylate, ethyl (meth)acrylate, n-propyl (meth)acrylate, n-butyl (meth)acrylate, i-butyl (meth)acrylate, t-butyl (meth)acrylate, n-pentyl (meth)acrylate, n-hexyl (meth)acrylate, 2-ethylhexyl (meth)acrylate, lauryl (meth)acrylate and stearyl (meth)acrylate; vinyl aromatic compounds such as styrene and α-methylstyrene; alicyclic hydrocarbon group-containing (meth)acrylates such as cyclohexyl (meth)acrylate and isobornyl (meth)acrylate; hydroxyl-containing polymerizable unsaturated monomers including hydroxyalkyl (meth)acrylates such as 2-hydroxyethyl (meth)acrylate, 2-hydroxypropyl (meth)acrylate, 3-hydroxypropyl (meth)acrylate and hydroxybutyl (meth)acrylate, allyl alcohol, and ε-caprolactone-modified forms of hydroxyalkyl (meth)acrylates; polyoxyalkylene group-containing polymerizable unsaturated monomers; carboxyl group-containing polymerizable unsaturated monomers such as (meth)acrylic acid, maleic acid, crotonic acid and β-carboxyethyl acrylate; (meth)acrylamide-alkanesulfonic acids such as 2-acrylamide-2-methylpropanesulfonic acid; sulfonic acid group-containing polymerizable unsaturated monomers including sulfoalkyl (meth)acrylates such as 2-sulfoethyl (meth)acrylate; phosphate group-containing polymerizable unsaturated monomers such as (2-acryloyloxyethyl) acid phosphate, (2-methacryloyloxyethyl) acid phosphate, (2-acryloyloxypropyl) acid phosphate and (2-methacryloyloxypropyl) acid phosphate; alkoxyalkyl (meth)acrylates such as 2-methoxyethyl (meth)acrylate and 2-ethoxyethyl (meth)acrylate; perfluoroalkyl (meth)acrylates and N,N-diethylaminoethyl (meth)acrylate; (meth)acrylamide and (meth)acrylonitrile; vinyl ester compounds such as vinyl acetate and vinyl propionate; aralkyl (meth)acrylates such as benzyl (meth)acrylatecarbonyl group-containing polymerizable unsaturated monomers such as (meth)acrolein, formyl styrol, C4-7 vinylalkylketone (for example, vinylmethylketone, vinylethylketone, vinylbutylketone, etc.), acetoacetoxyethyl (meth)acrylate, acetoacetoxyallyl ester and diacetone (meth)acrylamide; epoxy group-containing polymerizable unsaturated monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate and allylglycidyl ether; isocyanato group-containing polymerizable unsaturated monomers such as isocyanatoethyl (meth)acrylate and m-isopropenyl-α,α-dimethylbenzyl isocyanate; alkoxysilyl group-containing polymerizable unsaturated monomers such as vinyltrimethoxysilane, vinyltriethoxysilane, γ-methacryloyloxypropyltrimethoxysilane and γ-methacryloyloxypropyltriethoxysilane; oxidation curable group-containing polymerizable unsaturated monomers such as reaction products of unsaturated fatty acids with epoxy group-containing polymerizable unsaturated monomers or hydroxyl-containing polymerizable unsaturated monomers, dicyclopentenyloxyethyl (meth)acrylate, dicyclopentenyloxypropyl (meth)acrylate and dicyclopentenyl (meth)acrylate; and compounds with two or more polymerizable unsaturated groups in the molecule such as allyl (meth)acrylate, ethyleneglycol di(meth)acrylate, triethyleneglycol di(meth)acrylate, tetraethyleneglycol di(meth)acrylate, 1,3-butyleneglycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1-trishydroxymethylethane di(meth)acrylate, 1,1,1-trishydroxymethylethanetri(meth)acrylate, 1,1,1-trishydroxymethylpropanetri(meth)acrylate, triallyl isocyanurate, diallyl terephthalate and divinylbenzene; any of which may be used alone or in combinations of two or more.

The polymerizable unsaturated monomer composing the core preferably contains a compound with two or more polymerizable unsaturated groups in the molecule, and it is used in the range of preferably 0.01-1 mass % and more preferably 0.1-0.5 mass % with respect to the total polymerizable unsaturated monomer used for production of the core.

The emulsifier used may be an emulsifier that is known in the prior art, and examples of suitable emulsifiers include anionic emulsifiers, nonionic emulsifiers and zwitterionic emulsifiers.

As anionic emulsifiers there may be mentioned alkyldiphenylether disulfonates such as diammonium dodecyldiphenylether disulfonate, sodium dodecyldiphenylether disulfonate, calcium dodecyldiphenylether disulfonate and sodium alkyldiphenylether disulfonate; alkylbenzenesulfonates such as sodium dodecylbenzenesulfonate and ammonium dodecylbenzenesulfonate; alkyl sulfates such as sodium lauryl sulfate and ammonium lauryl sulfate; aliphatic carboxylic acid salts such as fatty acid sodium salts and potassium oleate; polyoxyalkylene unit-containing sulfates (for example, polyoxyethylenealkyl ether sulfates such as sodium polyoxyethylene alkyl ether sulfate and ammonium polyoxyethylene alkyl ether sulfate; polyoxyethylenealkylphenyl ether sulfates such as sodium polyoxyethylenealkylphenyl ether sulfate and ammonium polyoxyethylenealkylphenyl ether sulfate; and polyoxyethylenepolycyclic phenyl ether sulfates such as sodium polyoxyethylenepolycyclic phenyl ether sulfate and ammonium polyoxyethylenepolycyclic phenyl ether sulfate); naphthalenesulfonate-formalin condensate salts such as sodium naphthalene sulfonate-formalin condensate; and alkyl succinate sulfonates such as sodium dialkylsulfosuccinate and disodium monoalkylsuccinate sulfonate, any of which may be used alone or in combinations of two or more.

As examples of nonionic emulsifiers there may be mentioned polyoxyalkylene unit-containing ether compounds (for example, polyoxyalkylene alkyl ether compounds such as polyoxyethylene lauryl ether, polyoxyethylene stearyl ether, polyoxyethylene tridecyl ether and polyoxyethylene oleyl ether; polyoxyalkylenealkyl phenyl ether compounds such as polyoxyethyleneoctyl phenyl ether and polyoxyethylenenonyl phenyl ether; and polyoxyalkylenepolycyclic phenyl ether compounds such as polyoxyethylenepolycyclic phenyl ether); polyoxyalkylene alkyl ester compounds such as polyoxyethylene monolaurate, polyoxyethylene monostearate and polyoxyethylene monooleate; polyoxyalkylenealkylamine compounds such as polyoxyethylenealkylamine; and sorbitan compounds such as sorbitan monolaurate, sorbitan monostearate, sorbitan trioleate, polyoxyethylenesorbitan monolaurate and polyoxyethylenesorbitan monooleate, any of which may be used alone or in combinations of two or more.

As zwitterionic surfactants there may be mentioned dimethylalkylbetaines, dimethylalkyllaurylbetaines, alkylglycines and the like.

The emulsifier used may also be a reactive emulsifier containing a polymerizable unsaturated group and an anionic or nonionic group in the molecule.

As polymerization initiators for the polymerization, there may be used any of those mentioned in the explanation of the nonionic resin (A) above, selected as appropriate.

The resin aqueous dispersion composing the shell of the anionic core-shell resin (B) may be obtained by first-stage emulsion polymerization of a polymerizable unsaturated monomer mixture for the core using a polymerization initiator in the presence of an emulsifier to obtain a resin aqueous dispersion, followed by addition of the polymerizable unsaturated monomer mixture for the shell to the aqueous dispersion, and second-stage emulsion polymerization using a polymerization initiator, to obtain an aqueous dispersion of core-shell particles.

An emulsifier is generally not added during the second-stage emulsion polymerization, or if it is added it is preferably only in an amount that does not cause formation of new particles.

The polymerizable unsaturated monomer used for the second stage may be appropriately selected from among one or more of the examples of polymerizable unsaturated monomers to be used for polymerization in the first stage described above.

According to the invention, the resin composition obtained by mixing the nonionic resin (A) and core-shell resin (B) is characterized in that the resin of the core-shell resin (B) contains anionic groups so that pseudoplasticity is exhibited.

The anionic groups may be carboxyl groups, sulfonic acid groups, phosphate groups or the like, with carboxyl groups being especially preferred.

As specific examples of anionic group-containing polymerizable unsaturated monomers to be used for introducing the anionic groups, there may be mentioned carboxyl group-containing polymerizable unsaturated monomers such as (meth)acrylic acid, maleic acid, crotonic acid and β-carboxyethyl acrylate; (meth)acrylamide-alkanesulfonic acids such as 2-acrylamide-2-methylpropanesulfonic acid; sulfonic acid group-containing polymerizable unsaturated monomers including sulfoalkyl (meth)acrylates such as 2-sulfoethyl (meth)acrylate; and phosphate group-containing polymerizable unsaturated monomers such as (2-acryloyloxyethyl) acid phosphate, (2-methacryloyloxyethyl) acid phosphate, (2-acryloyloxypropyl) acid phosphate and (2-methacryloyloxypropyl) acid phosphate; with carboxyl group-containing polymerizable unsaturated monomers being especially preferred.

Such anionic group-containing polymerizable unsaturated monomers are used in an amount of preferably 0.1-10 mass % and more preferably 1-5 mass % of the total polymerizable unsaturated monomer used for production of the anionic core-shell resin (B).

In order for the resin composition of the invention to effectively exhibit pseudoplasticity, the anionic groups are preferably situated on the particle surfaces of the anionic core-shell resin (B), and preferably the resin composing the shell also has anionic groups.

In order for the aqueous coating resin composition of the invention to exhibit an adequate thickening effect, the anionic core-shell resin (B) may comprise a C1 or C2 alkyl ester of (meth)acrylic acid in the range of preferably 40-90 mass % and more preferably 60-80 mass % of the total polymerizable unsaturated monomer used for production of the aqueous dispersion of resin (B).

As examples of C1 or C2 alkyl esters of (meth)acrylic acid there may be mentioned methyl (meth)acrylate and ethyl (meth)acrylate, and any thereof may be used alone or in combinations of two or more.

The nonvolatile component weight ratio of the resin used as the core component and the resin used as the shell component in the anionic core-shell resin (B) may be such that the resin used as the shell component is 5-100 parts by mass and preferably 10-70 parts by mass with respect to 100 parts by mass of the resin used as the core component.

The mean particle size of the resin particles in the dispersion obtained by dispersing the anionic core-shell resin (B) in the aqueous medium may be in the range of, for example, 10-500 nm, especially 50-300 nm and most preferably 80-250 nm.

Aqueous Coating Resin Composition

The composition of the invention comprises the aforementioned nonionic resin (A) and anionic core-shell resin (B), and from the viewpoint of the pseudoplasticity of the aqueous coating resin composition, these are preferably used in a proportion in the range of 10/90-90/10, and especially 20/80-80/20, as the nonvolatile component weight ratio of (A)/(B).

According to the invention, the aqueous coating resin composition preferably also contains a associative thickener based on polyurethane. This will approximate Newtonian viscosity for the aqueous coating composition of the invention under low shear and impart a flow property during film formation, thus allowing a coated film with satisfactory smoothness to be formed.

As associative thickeners based on polyurethane there may be mentioned compounds with a urethane bond and a polyoxyalkylene unit in the molecule, and examples thereof include reaction products obtained by reacting mono or polyisocyanates and polyether monoalcohols as starting materials; and products obtained by reacting polyisocyanates, polyether monoalcohols and polyether polyols as starting materials.

Such associative thickeners based on polyurethane are commercially available, and as specific examples there may be mentioned "UH-420", "UH-450", "UH-472", "UH-462" and "UH-752" (all trade names of ADEKA Corp.), "PRI- MAL RM-8W", "PRIMAL RM-825", "PRIMAL RM-2020NPR", "PRIMAL RM-12W" and "PRIMAL SCT-275" (all trade names of Rohm & Haas), and "SN THICKENER 603", "SN THICKENER 607" "SN THICKENER 612" and "SN THICKENER 623N" (all trade names of San Nopco, Ltd.).

The amount of associative thickener based on polyurethane used is preferably in the range of 0.1-10 mass % and especially 0.5-3 mass % with respect to the total resin nonvolatile component of the nonionic resin (A) and anionic core-shell resin (B), in order to impart a Newtonian flow property with low shear rate and maintain pseudoplasticity with high shear rate.

Aqueous Coating Composition

The invention further provides an aqueous coating composition containing the aforementioned aqueous coating resin composition.

In addition to the water-dispersible nonionic resin (A) and water-dispersible anionic core-shell resin (B), the aqueous coating composition may, if necessary, also be used in combination with other appropriately selected water-soluble resins and/or water-dispersible resins that are normally used as film-forming components for aqueous coating materials. As examples of other water-soluble resins and/or water-dispersible resins there may be mentioned water-soluble or water-dispersed acrylic-based resins, urethane-based resins, alkyd-based resins, polyester-based resins, cellulose-based resins and the like.

The aqueous coating composition of the invention may also contain a crosslinking agent if necessary. As examples of crosslinking agents there may be mentioned water-soluble and water-dispersible melamine resins or (block) polyisocyanates, epoxy resins, oxazolines, carbodiimides and the like.

Also, if necessary, the aqueous coating composition of the invention may contain thickeners other than associative thickeners based on polyurethane, as well as antifoaming agents, curing catalysts, water, organic solvents, color pigments, extender pigments and the like, as additional components commonly used for preparation of aqueous coating materials.

Since the aqueous coating composition of the invention obtained in the manner described above exhibits excellent coating manageability and finished appearance, it can be suitably used as a base coat coating material, for example, in finishing methods wherein a base coat coating material is applied onto an article to be coated and then overcoated with a top clear coating material. It can also be used for different purposes other than a base coat coating material.

The articles coated with the aqueous coating composition are not particularly restricted, and as examples there may be mentioned metal materials such as iron, aluminum, brass, copper, stainless steel, tin, zinc-plated steel, alloyed zinc (Zn—Al, Zn—Ni, Zn—Fe, etc.)-plated steel and the like; resins such as polyethylene resins, polypropylene resins, acrylonitrile-butadiene-styrene (ABS) resins, polyamide resins, acrylic resins, vinylidene chloride resins, polycarbonate resins, polyurethane resins, epoxy resins and the like or plastic materials such as various FRP materials; inorganic materials such as glass, cement, concrete and the like; and fiber materials (paper, fabric, etc.).

The article to be coated may be pretreated by surface treatment such as phosphate treatment, chromate treatment, complex oxide treatment or the like, or have an undercoat and/or intercoat film formed from any of various electrodeposition coatings.

There are no particular restrictions on the article to be coated, and as examples there may be mentioned external platings of automobile bodies of passenger vehicles, trucks, motorcycles and buses; automobile parts; and external platings of consumer electric products such as cellular phones or audio devices.

The coated article according to the invention has a coated film formed from the aqueous coating composition of the invention and therefore exhibits an excellent outer appearance.

EXAMPLES

The present invention will now be explained in greater detail by examples. The "parts" and "%" values throughout the following explanation refer to "parts by mass" and "mass %".

Production of Acrylic Resin Solutions

Production Example 1

After adding 35.4 parts of ethyleneglycol monobutyl ether to a four-necked flask equipped with a stirrer, thermometer and nitrogen gas inlet tube, the temperature was raised to 85° C. under a nitrogen stream. When the temperature reached 85° C., a mixture of 20 parts of methyl methacrylate, 15 parts of n-butyl methacrylate, 35 parts of isobornyl acrylate, 10 parts of hydroxyethyl methacrylate, 20 parts of methoxypolyoxyethylene methacrylate (average number of oxyethylene units: 45) and 1 part of 2,2'-azobis(2,4-dimethylvaleronitrile) was added dropwise over a period of 3 hours. The monomer tank was rinsed with 4 parts of ethyleneglycol monobutyl ether and a mass was formed in the reaction mixture. Upon completion of the dropwise addition of the monomer and further reaction for 30 minutes, a solution comprising 0.5 part of 2,2'-azobis(2,4-dimethylvaleronitrile) and 11.8 parts of ethyleneglycol monobutyl ether was added dropwise over a period of 1 hour, the catalyst tank was further rinsed with 25 parts of ethyleneglycol monobutyl ether and a mass was formed in the reaction mixture. After additional stirring for 30 minutes, the mixture was cooled to 30° C. to obtain a yellow transparent nonionic acrylic resin solution (A-1) with a nonvolatile content of 50.0%.

Production Examples 2-4

Nonionic acrylic resin solutions (A-2) and (A-3) and an anionic acrylic resin solution (A-4) as a comparative production example were obtained by the same procedure as Production Example 1 above, except that the monomer composition of the acrylic resin solution in Production Example 1 was changed as shown in Table 1. The values of the properties of each of the resin solutions are shown in Table 1.

TABLE 1

|  |  | Production Examples | | | Comparative Production |
| --- | --- | --- | --- | --- | --- |
|  |  | 1 | 2 | 3 | Examples 4 |
| Resin solution |  | A-1 | A-2 | A-3 | A-4 |
| Monomer | Methyl methacrylate | 20 | 20 | 20 | 20 |
| composition | n-Butyl methacrylate | 15 | 25 | 5 | 11 |
|  | Isobornyl acrylate | 35 | 35 | 35 | 35 |

TABLE 1-continued

|  | Production Examples | | | Comparative Production Examples 4 |
|---|---|---|---|---|
|  | 1 | 2 | 3 |  |
| Hydroxyethyl methacrylate | 10 | 10 | 10 | 10 |
| Methoxypolyoxyethylene methacrylate | 20 | 10 | 30 | 20 |
| Methacrylic acid |  |  |  | 4 |
| Non-volatile content (%) | 50.0 | 50.0 | 50.0 | 50.0 |
| Acid value mgKOH/g | 0 | 0 | 0 | 31 |
| Weight-average molecular weight | 60,000 | 58,000 | 61,000 | 60,000 |

Production of Aqueous Acrylic Resins

Production Example 5

After adding 100 parts of the yellow transparent nonionic acrylic resin solution (A-1) into a stirring/mixing vessel, 150 parts of deionized water was slowly added while stirring, and then stirring was continued for 1 hour to obtain a slightly opaque aqueous acrylic resin (A-5) with a mean particle size of 34 nm and a nonvolatile content of 20.0%.

Production Examples 6-8

Aqueous acrylic resins (A-5)-(A-8) were obtained in the same manner as Production Example 5, except that the acrylic resin solution used in Production Example 5 was changed as shown in Table 2. The aqueous acrylic resins (A-5)-(A-7) of Production Examples 5-7 were slightly opaque, but the aqueous acrylic resin (A-8) of Production Example 8 was adjusted to pH 8.0 with dimethylethanolamine after addition of the deionized water. The aqueous acrylic resin (A-8) had a measured mean particle size of 9 nm, but its outer appearance was yellow transparent and it was water-soluble.

TABLE 2

|  |  | Production Examples | | | Comparative Production Examples |
|---|---|---|---|---|---|
|  |  | 5 | 6 | 7 | 8 |
| Aqueous acrylic resin |  | A-5 | A-6 | A-7 | A-8 |
| Composition | A-1 | 100.0 |  |  |  |
|  | A-2 |  | 100.0 |  |  |
|  | A-3 |  |  | 100.0 |  |
|  | A-4 |  |  |  | 100.0 |
|  | Deionized water | 150.0 | 150.0 | 150.0 | 150.0 |
| Mean particle size [nm] |  | 34 nm | 30 nm | 45 nm | 9 nm |

Production of Core-Shell Anionic Resin Aqueous Dispersions

Production Example 9

After adding 65 parts of deionized water and 0.5 part of "Newcol 562SF" (trade name of Nippon Nyukazai Co., Ltd., anionic emulsifier, nonvolatile content: 60%) to a reactor for production of the acrylic-based polymer, the mixture was mixed and stirred under a nitrogen stream and the temperature was raised to 85° C. Next, 5.2 parts of 4% and 3% ammonium persulfate aqueous solutions of a monomer emulsion comprising 80 parts of monomer mixture (1) below, 1.6 parts of "Newcol 562SF" and 55 parts of deionized water, were introduced into a reactor and kept at 85° C. for 15 minutes. The remaining monomer emulsion was then added dropwise into the reactor with a metering pump over a period of 3 hours, and upon completion of the dropwise addition the mixture was matured for 1 hour. Next, a monomer emulsion comprising 20 parts of monomer mixture (2), 0.5 part of "Newcol 562SF", 13 parts of deionized water and 3 parts of a 0.7% ammonium persulfate aqueous solution was added dropwise to the reactor over a period of 2 hours. After then adding 43 parts of a 0.5% dimethylethanolamine solution and cooling to 30° C., the lumps were removed with a 100 mesh nylon cloth to obtain an opaque anionic core-shell acrylic resin aqueous dispersion (B-1) with a mean particle size of 130 nm and a nonvolatile content of 35.2%.

| Monomer mixture (1) | |
|---|---|
| Methyl methacrylate | 36 parts |
| Ethyl acrylate | 20 parts |
| n-Butyl acrylate | 19.8 parts |
| Hydroxyethyl methacrylate | 4 parts |
| Allyl methacrylate | 0.2 parts |
| Monomer mixture (2) | |
| Methyl methacrylate | 5.5 parts |
| Ethyl acrylate | 10 parts |
| n-Butyl acrylate | 1 part |
| Hydroxyethyl methacrylate | 1 part |
| Methacrylic acid | 2.5 parts |

Production of Core-Shell Resin Aqueous Dispersion with No Anionic Groups in the Resin Production Example 10

An opaque core-shell resin aqueous dispersion (B-2) was obtained by the same procedure as Production Example 9, except that the composition of the monomer mixture (2) added dropwise in Production Example 9 was changed as listed below. The mean particle size of the core-shell resin aqueous dispersion (B-2) was 120 nm, and the nonvolatile content was 35.2%.

| Monomer mixture (2) | |
|---|---|
| Methyl methacrylate | 8.0 parts |
| Ethyl acrylate | 10 parts |
| n-Butyl acrylate | 1 part |
| Hydroxyethyl methacrylate | 1 part |

Production of Monolayer Anionic Resin Aqueous Dispersion

Production Example 11

After adding 65 parts of deionized water and 0.5 part of "Newcol 562SF" (trade name of Nippon Nyukazai Co., Ltd., emulsifier, nonvolatile content: 60%) to a reactor for production of the acrylic-based polymer, the mixture was mixed and stirred under a nitrogen stream and the temperature was raised to 85° C. Next, 5.5 parts of 4% and 3% ammonium persulfate aqueous solutions of a monomer emulsion comprising 100 parts of the monomer mixture listed below, 2 parts of "Newcol 562SF" and 65 parts of deionized water, were introduced into a reactor and kept at 85° C. for 15 minutes. The remaining monomer emulsion was then added dropwise into the reactor with a metering pump over a period of 3 hours, and upon completion of the dropwise addition the mixture was matured for 1 hour. After then adding 45 parts of a 0.5% dimethylaminoethanol solution and cooling to 30° C., the lumps were filtered out with a 100 mesh nylon cloth to obtain an opaque monolayer acrylic resin aqueous dispersion (B-3) with a mean particle size of 120 nm and a nonvolatile content of 35.3%.

| Monomer mixture | |
|---|---|
| Methyl methacrylate | 45 parts |
| Ethyl acrylate | 25 parts |
| n-Butyl acrylate | 22.5 parts |
| Hydroxyethyl methacrylate | 5 parts |
| Methacrylic acid | 2.5 parts |

Production of Aqueous Resin Compositions

Example 1

After charging 100 parts of the core-shell anionic resin aqueous dispersion (B-1) obtained in Production Example 9 above into a stirring/mixing vessel, 100 parts of the aqueous acrylic resin (A-5) obtained in Production Example 5 above was slowly added while stirring, and deionized water was added to the nonvolatile component concentration listed in the table, after which the mixture was adjusted to pH 8.0 with dimethylethanolamine to obtain aqueous resin composition (C-1).

Examples 2-7, Comparative Examples 1-6

Aqueous resin compositions (C-2)-(C-13) were obtained in the same manner as Example 1, except that the mixing composition in Example 1 was changed as shown in Table 3. The results of measuring the viscosity of each aqueous resin composition are also shown in Table 3.

The viscosity (Pa·s) was measured by adjusting the temperature of the sample to 25° C. and using a commercially available viscometer (HAAKE RheoStress RS150, trade name of HAAKE, Germany). The shear rate was varied between $0.001\ s^{-1}$-$1000\ s^{-1}$ for the measurement. The values in Table 3 are the viscosities (Pa·s) with low shear rates of $0.1\ s^{-1}$ and $1.0\ s^{-1}$ in consideration of flow during film formation, and with a high shear rate of $1000\ s^{-1}$ in consideration of spray coating.

Performance Evaluation

Each aqueous resin composition was provided for the following finished appearance test in order to evaluate the coating manageability. The results are summarized in Table 3.

Finished Appearance Test (Coating Manageability)

Each aqueous resin composition was applied onto a 10 cm×30 cm tin plate stationed in the perpendicular direction, by air spraying to a dry film thickness of 15 μm in an atmosphere with a coating temperature of 25° C. and a humidity of 75%, and after setting for 5 minutes, each was dried under conditions of 80° C., 10 minutes and evaluated based on the following scale.

A: No sagging, satisfactory smoothness.
B: No sagging, slightly rounded sections observed.
C: No sagging, significant rounded sections observed.
D: Notable sagging, unsatisfactory smoothness.

TABLE 3

| | | Examples | | | | | | | Comparative Examples | | | | | |
|---|---|---|---|---|---|---|---|---|---|---|---|---|---|---|
| | | 1 | 2 | 3 | 4 | 5 | 6 | 7 | 1 | 2 | 3 | 4 | 5 | 6 |
| | | C-1 | C-2 | C-3 | C-4 | C-5 | C-6 | C-7 | C-8 | C-9 | C-10 | C-11 | C-12 | C-13 |
| Aqueous resin composition | A-5 | 100.0 | 160.0 | 120.0 | 80.0 | | | | 100.0 | | | | 100.0 | 100.0 |
| | A-6 | | | | | 100.0 | 60.0 | | | | | | | |
| | A-7 | | | | | | | 100.0 | | | | | | |
| | A-8 | | | | | | | | | | 100.0 | 100.0 | | |
| | B-1 | 142.9 | 57.1 | 114.3 | 171.4 | 142.9 | 200.0 | 142.9 | | 100.0 | 142.9 | 142.9 | | |
| | B-2 | | | | | | | | | | | | 142.9 | |
| | B-3 | | | | | | | | | | | | | 142.9 |
| | PRIMAL SCT-275 | | | | | | 5.7 | | | | | | | |
| | Deionized water | 590.5 | 616.2 | 599.0 | 581.9 | 590.5 | 567.6 | 590.4 | 733.3 | 733.3 | 590.5 | 257.1 | 590.4 | 590.5 |
| Solid content [%] | | 12.0 | 12.0 | 12.0 | 12.0 | 12.0 | 12.0 | 12.0 | 12.0 | 12.0 | 12.0 | 20.0 | 12.0 | 12.0 |
| pH | | 8.0 | 8.0 | 8.0 | 8.0 | 8.0 | 8.0 | 8.0 | 8.0 | 8.0 | 8.0 | 8.0 | 8.0 | 8.0 |
| Viscosity [Pa·s] | 0.1 [1/s] | 14 | 15 | 26 | 13 | 9 | 11 | 25 | 0.02 | 0.05 | 0.02 | 0.1 | 0.03 | 0.02 |
| | 1.0 [1/s] | 3.1 | 3.5 | 4.5 | 2.5 | 2.4 | 11 | 3.6 | 0.02 | 0.04 | 0.02 | 0.09 | 0.03 | 0.02 |
| | 1000 [1/s] | 0.08 | 0.08 | 0.08 | 0.09 | 0.07 | 0.1 | 0.09 | 0.02 | 0.04 | 0.02 | 0.07 | 0.03 | 0.02 |
| Finished appearance | | B | B | B | B | B | A | B | D | D | D | D | D | D |

"PRIMAL SCT-275": trade name of Rohm & Haas, associative thickener based on polyurethane with nonvolatile content of 17.5%.

Industrial Applicability

The present invention can provide aqueous coating compositions exhibiting both satisfactory coating manageability and finished appearance, and is therefore industrially useful.

The invention claimed is:

1. An aqueous coating resin composition comprising a water-dispersible nonionic resin (A) and a water-dispersible anionic core-shell resin (B), characterized in that the water-dispersible nonionic resin (A) contains a polyoxyalkylene group-containing polymerizable unsaturated monomer (a1) at 5-50 mass % of the total polymerizable unsaturated monomer used for production of the resin (A) wherein said resin contains no ionic functional groups and contains both a polymerizable unsaturated monomer with a C4 and greater hydrocarbon group and a hydroxyl-containing polymerizable unsaturated monomer as copolymerizable components, and the water-dispersible anionic core-shell resin (B) contains an anionic group in the resin.

2. An aqueous coating resin composition according to claim 1, wherein the water-dispersible nonionic resin (A) is obtained by copolymerizing a polymerizable unsaturated monomer mixture containing the polyoxyalkylene group-containing polymerizable unsaturated monomer (a1) at 5-50 mass %, in the presence of a hydrophilic organic solvent.

3. An aqueous coating resin composition according to claim 1, wherein the mean particle size of the nonionic resin particles in a dispersion obtained by dispersing the water-dispersible nonionic resin (A) in an aqueous medium is in the range of 10-200 nm.

4. An aqueous coating resin composition according to claim 1, wherein the water-dispersible anionic core-shell resin (B) is produced by emulsion polymerization of a polymerizable unsaturated monomer in two stages, in the presence of water and an emulsifier.

5. An aqueous coating resin composition according to claim 1, wherein the copolymerization ratio of C1 or C2 alkyl esters of (meth)acrylic acid in the water-dispersible anionic core-shell resin (B) is in the range of 40-90 mass % of the total polymerizable unsaturated monomer used for production of the resin (B).

6. An aqueous coating resin composition according to claim 1, wherein the mean particle size of the anionic resin particles in a dispersion obtained by dispersing the water-dispersible anionic core-shell resin (B) in an aqueous medium is in the range of 10-500 nm.

7. An aqueous coating resin composition according to claim 1, wherein the proportion of the water-dispersible nonionic resin and water-dispersible dispersible anionic core-shell resin (B) used is in the range of 10/90-90/10, as the nonvolatile component weight ratio of (A)/(B).

8. An aqueous coating resin composition according to claim 1, which further contains an associative thickener based on polyurethane.

9. An aqueous coating comprising an aqueous coating resin composition according to claim 1.

10. A coating method comprising applying an aqueous coating resin composition according to claim 1 is applied onto an article to be coated.

11. A coated article having a coated film formed from an aqueous coating resin composition according to claim 1.

* * * * *